(12) United States Patent
Dielacher et al.

(10) Patent No.: US 9,635,351 B2
(45) Date of Patent: Apr. 25, 2017

(54) INTEGRATED REFERENCE PIXEL

(71) Applicant: Infineon Technologies AG, Neubiberg (DE)

(72) Inventors: Markus Dielacher, Graz (AT); Martin Flatscher, Graz (AT); Michael Mark, Graz (AT); Josef Prainsack, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/085,501

(22) Filed: Nov. 20, 2013

(65) Prior Publication Data

US 2015/0138371 A1    May 21, 2015

(51) Int. Cl.
| | | |
|---|---|---|
| H04N 17/00 | (2006.01) | |
| H04N 17/02 | (2006.01) | |
| H04N 13/02 | (2006.01) | |
| G06F 3/01 | (2006.01) | |
| G01S 17/89 | (2006.01) | |
| G01S 7/497 | (2006.01) | |

(52) U.S. Cl.
CPC ........... *H04N 17/002* (2013.01); *G01S 7/497* (2013.01); *G01S 17/89* (2013.01); *G06F 3/017* (2013.01); *H04N 13/0253* (2013.01)

(58) Field of Classification Search
CPC .. H04N 17/002; H04N 13/0253; G01S 7/497; G01S 17/89; G06F 3/017
USPC .......................................................... 348/180
See application file for complete search history.

(56) References Cited

U.S. PATENT DOCUMENTS

| | | | | |
|---|---|---|---|---|
| 5,521,639 | A | * 5/1996 | Tomura | ............. H01L 27/14831 |
| | | | | 257/E27.154 |
| 2006/0228050 | A1 | 10/2006 | Xu et al. | |
| 2009/0002527 | A1* | 1/2009 | Higuchi | ......................... 348/243 |
| 2011/0315859 | A1* | 12/2011 | Tanaka | ...................... 250/214 R |
| 2012/0091321 | A1* | 4/2012 | Tanaka et al. | ............. 250/208.2 |

FOREIGN PATENT DOCUMENTS

DE          2346183 A1    3/1974

* cited by examiner

*Primary Examiner* — Michael Lee
(74) *Attorney, Agent, or Firm* — Harrity & Harrity, LLP

(57) ABSTRACT

Representative implementations of devices and techniques provide dynamic calibration for imaging devices and systems. A reference pixel is arranged to receive an electrical reference signal and to output a calibration signal. The reference signal may be based on imaging illumination.

25 Claims, 7 Drawing Sheets

INTEGRATED REFERENCE PIXEL

BACKGROUND

Imaging systems based on light waves are becoming more widely used for object detection as semiconductor processes have become faster to support such systems. Some imaging systems are capable of providing dozens of images per second, making such systems useful for object detection and/or tracking in changing environments. Due to their potentially small form factor and potentially high signal fidelity, some imaging systems are well suited for application in many types of vehicles (cars, busses, trains, etc.). Additionally, some imaging systems are well suited for gesture control, or the like, in many types of consumer devices (e.g., television, computers, tablets, smartphones, etc.). While the resolution of such imaging systems may vary, applications using these systems are able to take advantage of the speed of their operation.

Time-of-flight cameras, for example, may use pixels to measure the time-of-flight of a light signal as it travels between the camera and an object, to determine a distance of the object from the camera. Multiple pixels may also be used, where light signals associated with individual pixels may provide distance measurements for discrete points on the object, forming a three-dimensional "distance image." This can be made possible by detecting differences in the delays associated with reflected light signals off of the discrete points, for example.

Time-of-flight principles can be sensitive to delays occurring inside the camera, however, as the delays can distort the distance measurements. In some cases, the driver of the illumination unit, which emits the light radiation, can cause additional delays. For example, delays can occur between the electrical illumination control signals generated by the system and the actual emitted optical signals. Since delays can be temperature dependent, or vary based on other factors, compensating for the delays can be problematic.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

Figure 1:
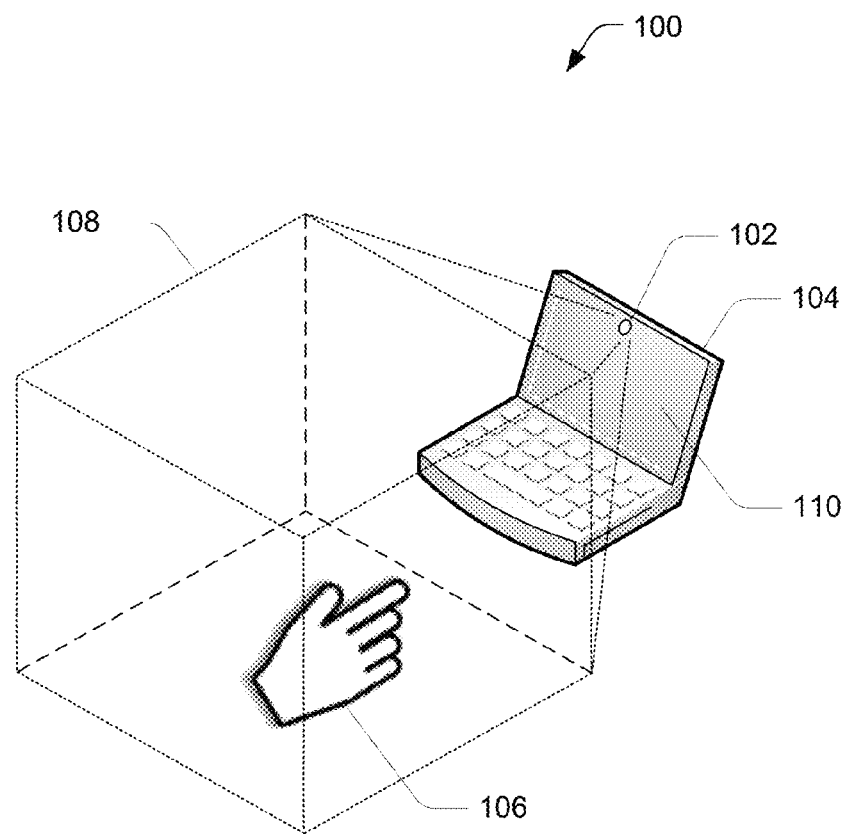
FIG. 1 is an illustration of an example application environment in which the described devices and techniques may be employed, according to an implementation.

This disclosure is related to imaging systems (imaging systems using emitted electromagnetic (EM) radiation, for example) that are arranged to detect, image, recognize, and/or track objects and/or gestures in a predetermined area relative to the imaging systems. For example, an imaging system associated with a vehicle may be used to detect an object in the path of the vehicle, or in an area near the vehicle. Additionally, the imaging system may track the object or provide an image (such as a three-dimensional image, for example) of the object. In other examples, an imaging system may be used to detect and recognize gestures of an object or a human hand, for instance, in an area near a computing device. The imaging system may recognize when the object or hand is making a gesture, and track the hand-gesture combination as a replacement for a mouse or other input to the computing device.

In various implementations, the imaging system uses time-of-flight principles, such as distance calculations of reflected EM emissions (i.e., electro-magnetic radiation), to detect, image, recognize, and/or track objects, for example. Time-of-flight distance calculations may be based on receiving reflections of emitted EM ("light") radiation, as the light radiation is reflected off objects in a predetermined area. For example, the distance calculations may be based on the speed of light and the travel time of the reflected light radiation.

As mentioned above, time-of-flight principles can be sensitive to delays occurring inside the imaging systems, since the delays can distort the time-of-flight distance measurements. In some cases, components or modules of the imaging systems (such as the driver of the illumination unit, for example) can cause the delays.

Representative implementations of devices and techniques provide dynamic calibration for imaging devices and systems. In various implementations, the dynamic calibration compensates for delays, such as delays due to components and/or modules of the imaging systems. In some implementations, the dynamic calibration is automatic, occurring approximately real-time, as environmental factors, and the like, create variations to the delays. In various implementations, the dynamic calibration corrects measurements made by the imaging devices and systems. In other implementations, the dynamic calibration adjusts other parameters of the imaging devices and systems, such that resulting measurements and/or images, etc., are more accurate.

In an implementation, a calibration arrangement is employed with an imaging system, providing dynamic calibration to the imaging system as described above. In one implementation, a reference pixel of the calibration arrangement is arranged to receive an electrical reference signal and to output a calibration signal. In an implementation, the reference pixel is shielded from light radiation, being arranged to receive the electrical reference signal instead of an optical signal. In a variation of the implementation, the reference pixel may be arranged to receive the electrical reference signal in addition to receiving an optical signal.

In one implementation, the reference pixel is arranged within an array of photosensitive pixels that receive optical signals and output electrical signals to form images, calculate distances, track objects, and the like. For example, in the implementation, the reference pixel may be one of a plurality of pixels of an image sensor, or the like.

In an implementation, the electrical reference signal is based on imaging illumination (i.e., illumination used by the imaging system to capture an image of an area, calculate a distance, track an object, etc.), or the like. In various implementations, the calibration signal is received by a calibration unit (e.g., system, module, component, circuit, etc.), which is arranged to perform the dynamic calibration on one or more portions of the imaging system.

Various implementations and arrangements for imaging systems, devices, and techniques are discussed in this disclosure. Techniques and devices are discussed with reference to example light-based imaging systems and devices illustrated in the figures. However, this is not intended to be limiting, and is for ease of discussion and illustrative convenience. The techniques and devices discussed may be applied to any of various imaging device designs, structures, and the like (e.g., radiation based, sonic emission based, particle emission based, etc.) and remain within the scope of the disclosure.

Implementations are explained in more detail below using a plurality of examples. Although various implementations and examples are discussed here and below, further implementations and examples may be possible by combining the features and elements of individual implementations and examples.

Example Imaging System Environment

FIG. 1 is an illustration of an example application environment 100 in which the described devices and techniques may be employed, according to an implementation. As shown in the illustration, an imaging system 102 may be applied with a computing device, and also may be applied with a vehicle, a robot, a manufacturing machine, a medical apparatus, and so forth, herein referred to as an "application" 104. In various implementations, with various applications 104, the imaging system 102 may be used to detect the presence, movement, distance, etc. of an object 106, such as a human hand, for example, in a predetermined area 108 located relative to the application 104. An example object 106 may include any item that an imaging system 102 may be arranged to detect, recognize, track and/or the like.

In one implementation, the imaging system 102 is arranged to detect and/or recognize a gesture of the object 106, and may be arranged to track the movement of the object 106, for example. In an implementation, an output of the imaging system 102 may be presented or displayed on a display device 110, for example. In alternate implementations, the presence of the object 106 within the area 108 may result in the imaging system 102 executing preset actions (e.g., capturing an image, emitting an audible tone, activating a braking system, etc.).

In various implementations, the imaging system 102 may be integrated with the application 104, or may have some components separate or remote from the application 104. For example, some processing for the imaging system 102 may be located remotely (e.g., cloud, network, etc.). In another example, some outputs from the imaging system 102 may be transmitted, displayed, or presented on a remote device or at a remote location.

The illustration of FIG. 1 shows a predetermined area 108 as a cube-like area in front of the application 104. This is for illustration and discussion purposes, and is not intended to be limiting. The predetermined area may be to the front, side(s), top, or around the application 104, for example. The predetermined area 108 may be any shape or size, and may be chosen such that it will generally encompass desired objects when they are present, but not encompass undesired objects (e.g., other items that are not intended to be detected, recognized, tracked, or the like).

Example Imaging System

Figure 2:
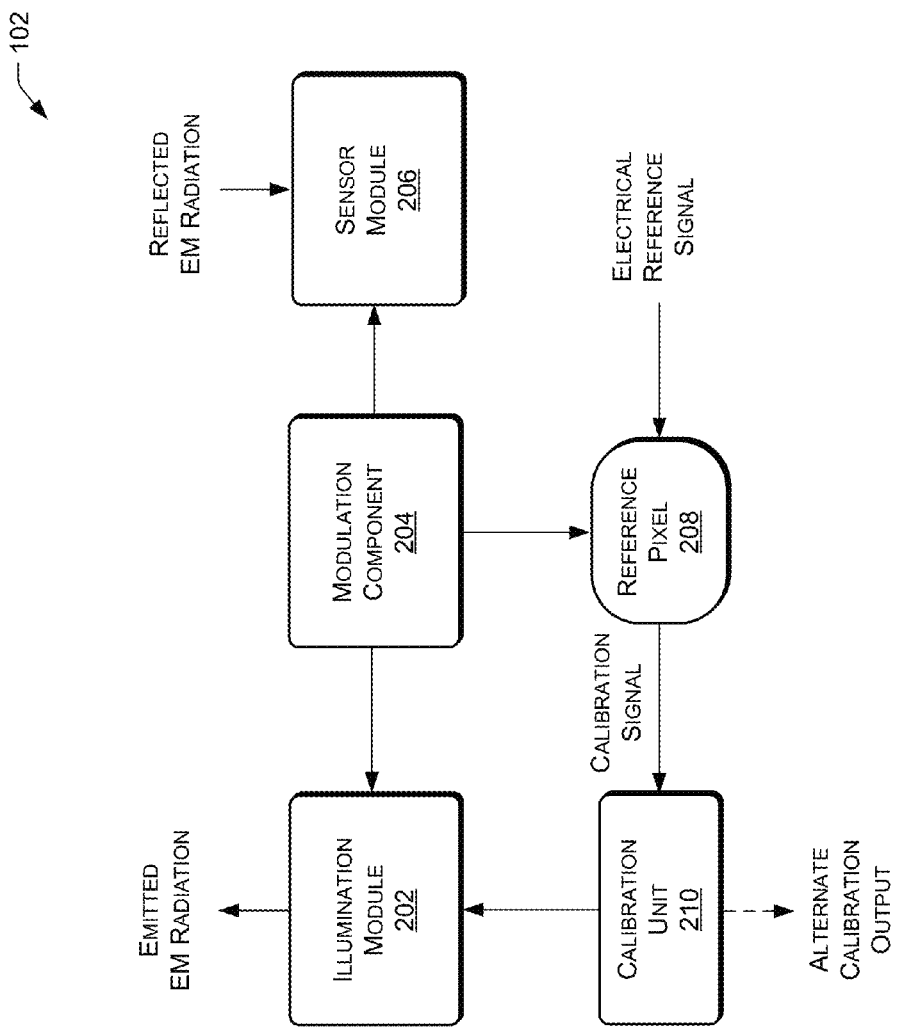
FIG. 2 is a schematic drawing showing an example solution employing a reference pixel.

FIG. 2 is a block diagram showing example components of an imaging system 102, according to an implementation. As shown in FIG. 2, an imaging system 102 may include an illumination module 202, a modulation component 204, a sensor module 206, a reference pixel 208, and a calibration unit 210. In various implementations, an imaging system 102 may include fewer, additional, or alternate components, and remain within the scope of the disclosure. One or more components of an imaging system 102 may be collocated, combined, or otherwise integrated with another component of the imaging system 102. For example, in one implementation, the imaging system 102 may comprise an imaging device or apparatus. Further, one or more components of the imaging system 102 may be remotely located from the other(s) of the components.

If included in an implementation, the illumination module 202 is arranged to emit electromagnetic (EM) radiation (e.g., light radiation) to illuminate at least a portion of the area 108. In an implementation, the illumination module 202 includes a light emitter, for example. In various implementations, the light emitter comprises a light-emitting diode (LED), a laser emitter, or the like. In one implementation, the illumination module 202 illuminates the entire environment (e.g., the predetermined area 108) when active. In an alternate implementation, the illumination module 202 illuminates the environment in pulses, stages, or scans.

In various implementations, different forms of light radiation may be emitted from the illumination module 202. In some implementations, infrared light, or the like, is emitted. For example, the light radiation may comprise one or more modulated light pulses. The illumination module 202 may be switched on for a short interval, allowing the emitted light pulse(s) to illuminate the area 108, including any objects 106 within the area 108. Infrared light, for example, provides illumination to the area 108 that is not visible to the human eye, and so is not distracting. In other implementations, other types or frequencies of light radiation may be emitted that provide visual feedback or the like. As mentioned above, in alternate implementations, other energy forms (e.g., radiation based, sonic emission based, particle emission based, etc.) may be emitted by the illumination module 202.

In an implementation, the illumination module 202 is arranged to illuminate one or more objects 106 that may be present in the area 108, to detect the presence of the object(s) 106, to detect movement of the object(s) 106, to capture an image of the object(s) 106, and the like.

If included in an implementation, the modulation component 204 is arranged to modulate the light radiation emitted from the illumination module 202 via a modulation signal. In another implementation, the modulation component 204 is arranged to modulate one or more photosensitive pixels of the sensor module 206 to conform to the modulated light radiation. In one example implementation, the modulation component 204 is arranged to correlate the modulation of the light radiation with the modulation of the pixels of the sensor module 206 during time-of-flight operation (e.g., to calculate a distance of an object from the imaging system 102, for example).

In various implementations, as shown in FIG. 2, a sensor module 206 is included in the imaging system 102. In one implementation, the sensor module 206 is arranged to receive reflected light radiation from object(s) 106 in the area 108. In an implementation, the sensor module 206 is comprised of multiple photosensitive pixels. In one example, each of the multiple pixels may be an individual image sensor. In such an example, a resulting image from the sensor module 206 may be a combination of the sensor images of the individual pixels. In an implementation, each of the plurality of photosensitive pixels is arranged to convert the reflection of the light radiation into an electrical signal. In various implementations, the signals from the pixels may be processed into an image by one or more processing components.

In an implementation, the sensor module 206 is arranged to capture one or more images of the area 108, or of object(s) 106 within the area 108. For example, the sensor module 206 may capture a three-dimensional image of the area 108. In an implementation, the sensor module 206 (or the individual pixels of the sensor module 206) provides a measure of the time for light radiation to travel from the illumination module 202, to the object 106, and back to each of the pixels of the sensor module 206. In another implementation, the sensor module 206 is arranged to use time-of-flight principles to capture a three-dimensional image of an object 106 within an area 108, based on a modulated illumination of the area 108.

For example, in one implementation, the sensor module 206 can detect whether an object is in the area 108 based on the time that it takes for the light radiation emitted from the illumination module 202 to be reflected back to the pixels of the sensor module 206. This can be compared to the time that it takes for the light radiation to return to the sensor module 206 when no object is in the area 108, for example.

In various examples and implementations, as shown in FIGS. 2-6, various imaging systems may include at least one reference pixel 208. In the examples and implementations, the reference pixel 208 may be used to provide a reference or a calibration for the imaging system 102.

Figure 3:
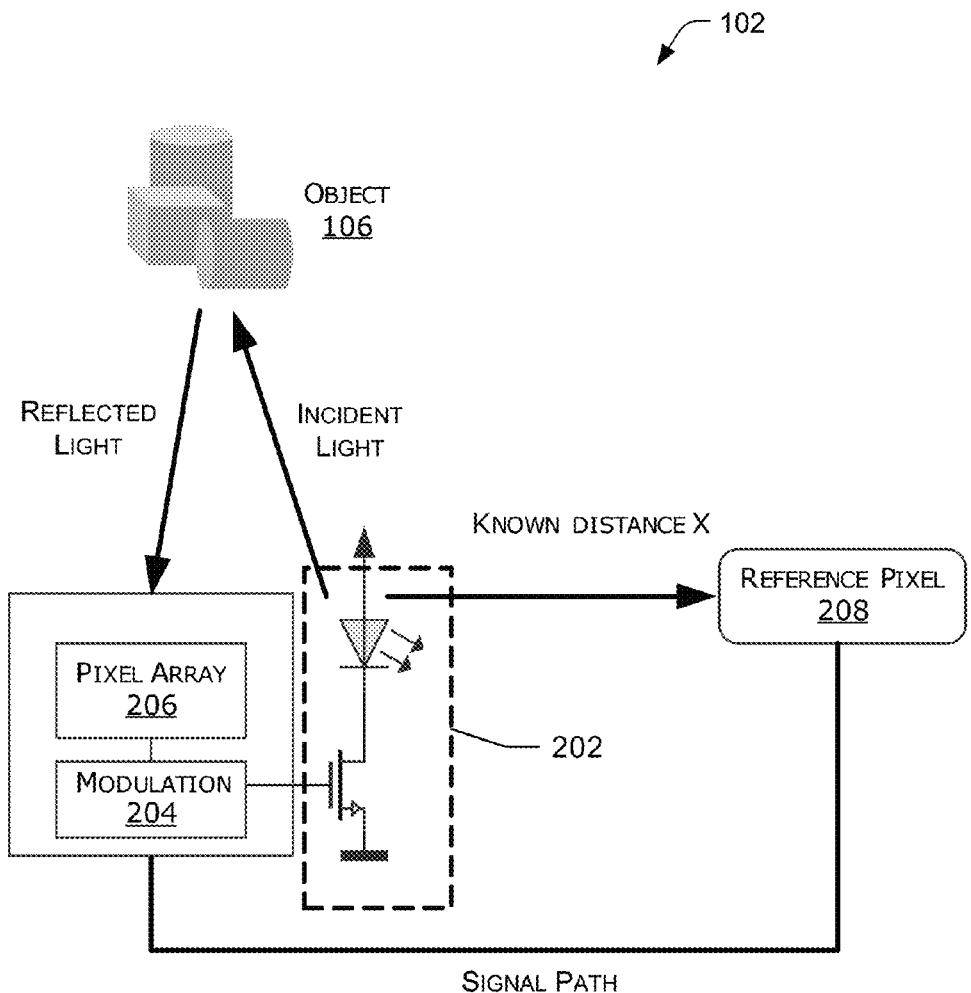
FIG. 3 is a block diagram of example imaging system components, according to an implementation.

In one example arrangement, as shown in FIG. 3, a reference pixel 208 is used with an imaging system 102 to determine a delay of the imaging system 102. For example, as illustrated in FIG. 3, the reference pixel 208 is located a known distance "x" from the illumination module 202. In the example, a fraction of the light radiation emitted from the illumination module 202 is received by the reference pixel 208. Since the speed of light is a constant, the time for the light radiation to cover the distance "x" from the illumination module 202 to the reference pixel 208 is known. Any delay(s) built into the imaging system 102 can be calculated by subtracting the known reference distance "x" from the distance measured by the imaging system 102 using light received by the reference pixel 208.

In an example, the difference between the measured distance and the known distance "x" can be used to correct measurements made by pixels of the pixel array (e.g., sensor module) 206. However, in some cases, signal paths between the reference pixel 208 and the imaging components of the imaging system 102 may introduce additional delays. For example, signal paths for a differential read out, signal paths for modulation of pixel devices, control signal paths, bias voltage paths, and the like, may contribute to delays that have a potential of disturbing the calibration of the imaging system 102.

In various implementations, additional or alternative components may be used to accomplish the disclosed techniques and arrangements.

Example Implementations

Figure 4:
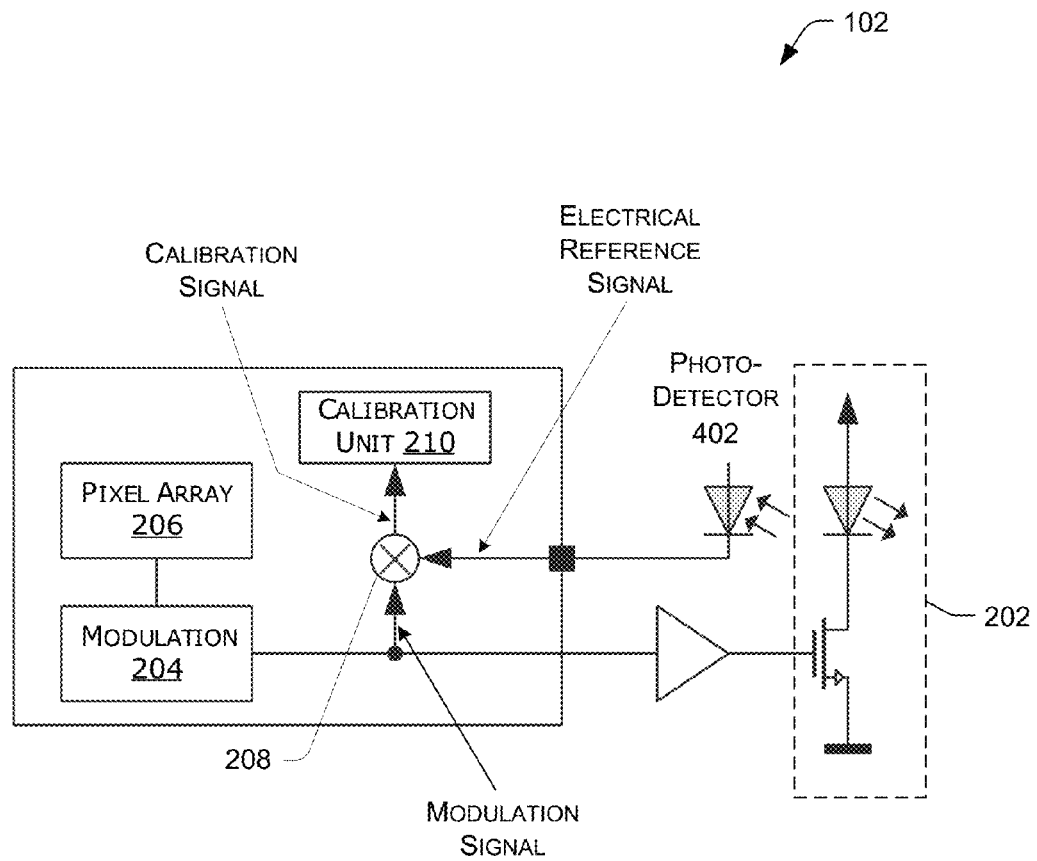
FIG. 4 is a schematic drawing showing an example imaging system having a calibration arrangement employing a reference pixel, according to an implementation.
Figure 6:
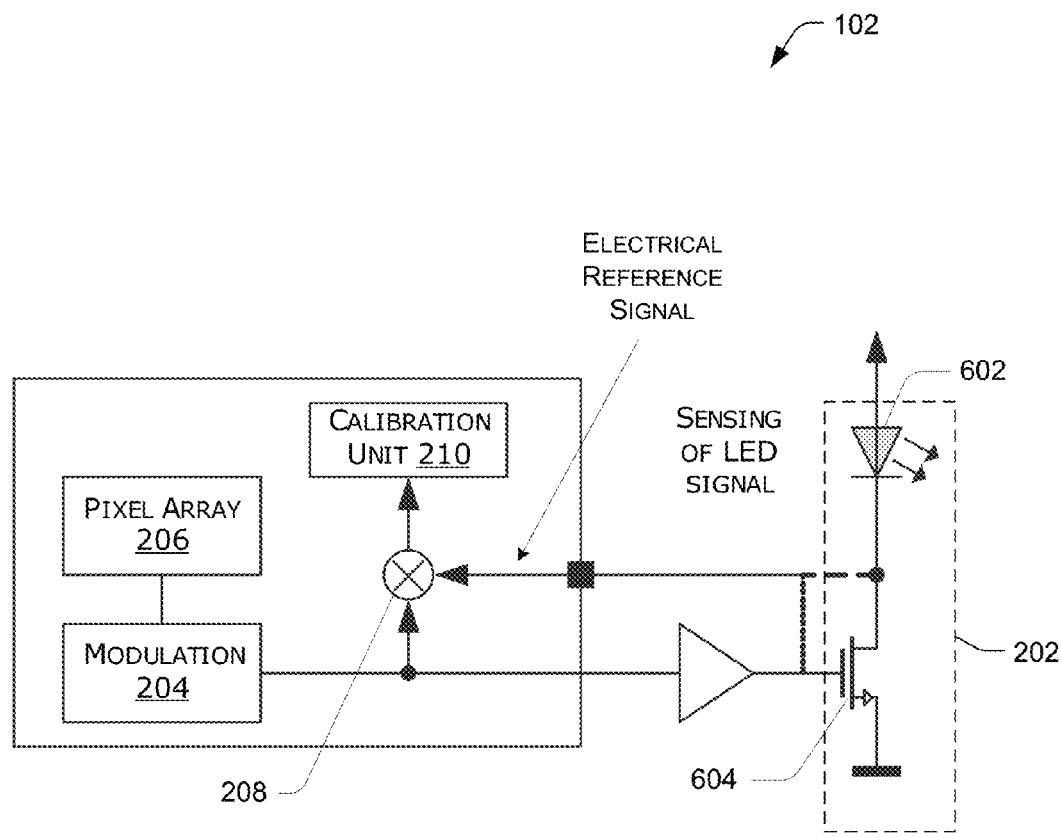
FIG. 6 is a schematic drawing showing another example imaging system having a calibration arrangement employing a reference pixel, according to an implementation.

In various implementations, as shown in FIGS. 2, 4, and 6, a reference pixel 208 is included with an imaging system 102 to determine a delay of the imaging system 102 and/or to output a calibration signal based on the delay of the imaging system 102. In some implementations, the reference pixel 208 comprises a photosensitive pixel device, such as a photonic mixing device (PMD), a photo gate, or the like, arranged to mix two or more signals. In the implementations, an optical function of the reference pixel 208 and a mixing property of the reference pixel 208 are separated. For example, in the implementations, the reference pixel 208 is arranged to receive an electrical reference signal (instead of or in addition to an optical signal) based on the illumination module 202 emitting light radiation, and to output a calibration signal based on the electrical reference signal.

In example implementations, as shown in FIGS. 2, 4, and 6, the reference pixel 208 acts as an electrical signal mixer. For example, the reference pixel 208 is arranged to mix the electrical reference signal with the modulation signal output from the modulation component 204 to form the calibration signal. In various implementations, the calibration signal is arranged to calibrate the imaging system 102. In one implementation, the reference pixel 208 is arranged to output the calibration signal to the calibration unit 210.

Figure 5:
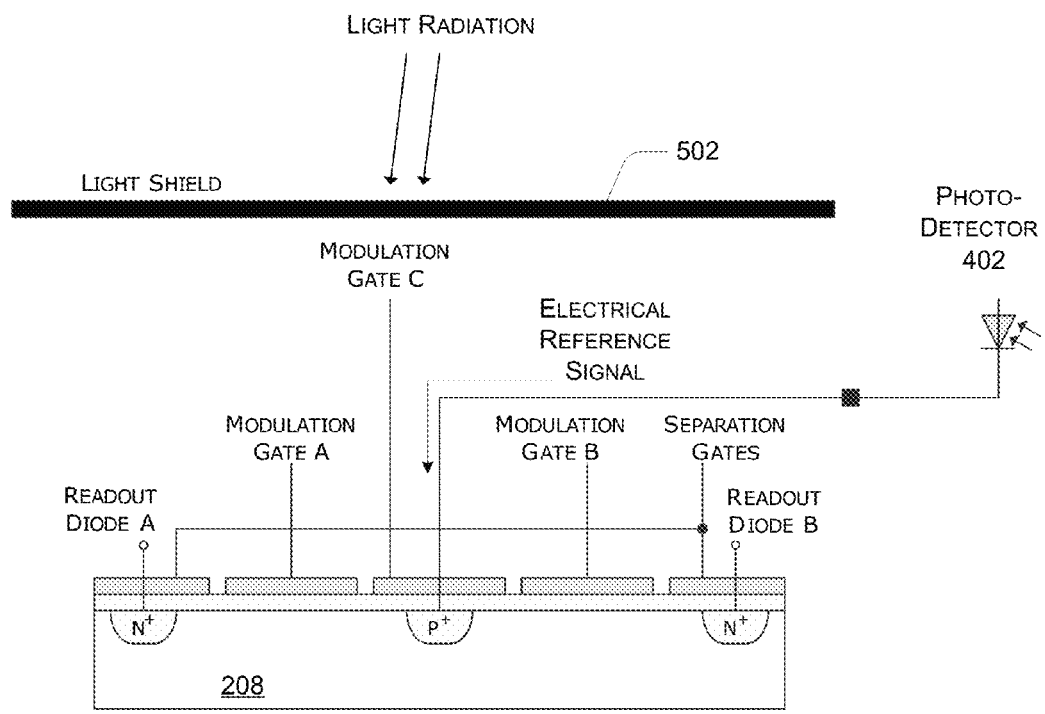
FIG. 5 is a schematic drawing showing an example reference pixel, which may be used with the calibration arrangement of FIG. 4, for example, according to an implementation.

In various implementations, as shown in FIG. 5, the reference pixel 208 is shielded from light radiation. For example, a light shield 502 may be positioned to shield the reference pixel 208 from light radiation. Accordingly, in such implementations, the optical (i.e., photosensitive) properties of the reference pixel 208 may not be used, since the shield 502 can be arranged to inhibit or prevent the reference pixel 208 from receiving light radiation.

In such implementations, the electrical reference signal received by the reference pixel 208 may be an electrical representation of an optical reference signal, such as the light radiation emitted by the illumination module 202. For example, the electrical representation of the optical reference signal (i.e., the electrical reference signal) may be proportional to an intensity of the optical reference signal. In alternate implementations, the electrical representation of the optical reference signal may be representative of other properties (e.g., a phase, a wavelength, a frequency, etc.) of the optical reference signal. For instance, in an implementation, the electrical representation of the optical reference signal contains the phase information of the optical reference signal.

In an implementation, the reference pixel 208 comprises one pixel of a plurality of photosensitive pixels comprising the sensor module 206. For example, in one implementation, the sensor module 206 is comprised of a plurality of photosensitive pixels (an array of photosensitive pixels, for example) arranged to receive light radiation reflected off objects 106 within the area 108, and to output signals to form the image of the area 108. In the implementation, the reference pixel 208 is one pixel of the plurality of photosensitive pixels, but is arranged to be shielded from light radiation. In the implementation, the reference pixel 208 is arranged to receive electrical signals (at least one electrical reference signal based on the illumination of the area 108 and at least one modulation signal based on modulation of the illumination) and to output the calibration signal based on the electrical signals received.

In an implementation, the magnitude of the calibration signal is proportional to a delay of one or more portions of the imaging system 102. For example, in one implementation, the magnitude of the calibration signal is proportional to a delay of the illumination module 202 associated with initiating an illumination sequence and emitting the light radiation. For example, the delay of the illumination module 202 to emit light radiation after the illumination module 202 has received a trigger to do so may be represented by the magnitude of the calibration signal. In other implementations, other properties of the calibration signal (e.g., relative phase, voltage or current offset, shape of waveform, etc.) may be used to represent the delay of the illumination module 202, or the delay of another portion of the imaging system 102.

In an implementation, the calibration signal is arranged to calibrate the imaging system 102. In one implementation, as shown in FIGS. 2, 4, and 6, the imaging system 102 includes a calibration unit 210 arranged to calibrate the imaging system 102, based on the calibration signal. In one example, the calibration unit 210 is arranged to dynamically calibrate the imaging system 102, via changes to the calibration signal. In some implementations, the dynamic calibration is automatic, occurring approximately real-time, as environmental factors, and the like, create variations to the delays. For example, as the delay of one or more portions of the imaging system 102 varies, due to environmental conditions, temperature change, or the like, the calibration unit 210 can dynamically calibrate the imaging system 102 to accommodate the varying delay, using the calibration signal.

In various implementations, the calibration unit 210 corrects measurements made by the imaging device 102 and/or its component systems. For example, in an implementation, the calibration unit 210 adjusts a measurement by an amount proportional to the calibration signal. In other implementations, the calibration unit 210 adjusts other parameters of the imaging device 102 and/or its component systems, such that resulting measurements and/or images, etc., are more accurate.

FIG. 4 is a schematic drawing showing an example imaging system 102 having a calibration arrangement employing a reference pixel 208, according to an implementation. In one implementation, as shown in FIG. 4, the imaging system 102 includes a photosensitive component ("photo-detector") 402 (e.g., photo-diode, photo-transistor, etc.) arranged to receive the light radiation output from the illumination module 202. In the implementation, the photo-detector 402 is arranged to output the electrical reference signal, based on the light radiation received. In various implementations, the photo-detector 402 may be arranged to output the electrical reference signal to the reference pixel 208, as shown in FIGS. 4 and 5. In such implementations, the photo-detector 402 may interface with the reference pixel 208 via biasing circuitry, an amplifier/attenuator, or other components or circuits (optional interface components/circuits are indicated in FIGS. 4 and 5 by the filled square in the reference signal path).

In the example implementations illustrated in FIGS. 4 and 5, the optical (e.g., photosensitivity) properties of the reference pixel 208 are handled by the photo-detector 402. For example, the photo-detector 402 receives the light radiation output from the illumination module 202 instead of the reference pixel 208, and the photo-detector 402 generates the electrical reference signal based on the light radiation. This electrical reference signal is output to the reference pixel 208 instead of being generated by the reference pixel 208. In an alternate implementation, the reference pixel 208 may receive a fraction of the light radiation, and may process the electrical reference signal in combination with a generated electrical signal based on receiving the light radiation.

In an implementation, the magnitude of the electrical reference signal output by the photo-detector 402 is proportional to the intensity of the light radiation received by the photo-detector 402. In alternate implementations, the magnitude (or some other property) of the electrical reference signal is based on another characteristic (e.g., phase-shift, wavelength, frequency, etc.) of the light radiation received by the photo-detector 402.

FIG. 5 is a schematic drawing showing an example reference pixel 208, which may be used with the imaging systems 102 of FIG. 2, 4, or 6, for example, according to various implementations. As discussed above, in some implementations, the reference pixel 208 may include a light shield 502 arranged to inhibit or prevent the reference pixel 208 from receiving light radiation. In an implementation, the light radiation is received by the photo-detector 402, which generates the electrical reference signal received by the reference pixel 208.

In various implementations, as also shown in FIG. 5, the reference pixel 208 receives one or more modulation signals (e.g., from a modulation component 204). For example, the reference pixel 208 may receive a modulation signal for each gate of the pixel, where the modulation signal corresponds to the modulation of the illumination (i.e., light radiation, etc.) emitted by the illumination module 202. In an implementation, one or more of the gate(s) of the reference pixel 208 (as well as gates of other pixels of the sensor module 206) are modulated to correspond to the modulated light radiation.

In an implementation, the reference pixel 208 is arranged to mix the electrical reference signal and at least one modulation signal to form the calibration signal. In the implementation, the calibration signal is directly proportional to the delay of the illumination module, and can be used to automatically and dynamically calibrate the imaging system 102.

In one implementation, as shown in FIG. 5, current from the received electrical reference signal is directly injected into the reference pixel 208. In the implementation, the reference pixel 208 is one pixel of the plurality of pixels comprising the sensor module 206, and no additional circuitry for controlling, modulating, or reading the reference pixel 208 is used. In one example implementation, the circuitry and pixel structure of the reference pixel 208 is identical or nearly identical to the other pixels of the sensor module 206 that are used for imaging and/or distance measurement.

FIG. 6 is a schematic drawing showing another example imaging system 102 having a calibration arrangement employing a reference pixel 208, according to an implementation. In the implementation of FIG. 6, no photosensitive component (like photo-detector 402, for example) may be used, such as in the imaging system 102 of FIG. 4. In the example of FIG. 6, the electrical reference signal is sensed or detected at portions of the illumination module 202, or at other points of the imaging system 102.

For example, in one implementation, the illumination module 202 includes an illumination source 602 (e.g., a light emitting diode (LED) a laser, a particle emitter, and so forth). The illumination source 602 emits the light radiation (or other emissions for other types of imagers) of the illumination module 202.

In an implementation, the imaging system 102 also includes a detection component (not shown). In the implementation, the detection component is arranged to detect a voltage drop across the illumination source 602 of the illumination module 202, and to output the electrical reference signal, based on the voltage drop. For example, the parasitic capacitance of the illumination source 602 may change with changes in temperature, which is responsible for the delay change of the emitted light. In many cases, the emitted light is proportional to the voltage drop across the illumination source 602, making the voltage drop a sufficient precursor for the electric reference signal. In an alternate implementation, the detection component may be arranged to detect the current through the illumination module 202.

In various examples, a property (e.g., the amplitude, etc.) of the electrical reference signal may be proportional to the magnitude (i.e., the absolute value of the amplitude) of the voltage drop across the illumination source 602. In alternate implementations, the detection component may be arranged to detect a voltage at other points of the illumination module 202.

For example, in one implementation, the illumination module 202 includes a semiconductor device 604 (such as a transistor, for example) arranged to control the illumination source 602 of the illumination module 202. For example, the semiconductor device 604 may be arranged to switch the illumination source 602 on and off, vary the intensity of the illumination, and the like. In an implementation, the detection component is arranged to detect the electrical reference signal based on a voltage at a gate of the semiconductor device 604. In an alternate implementation, the detection component is arranged to detect the electrical reference signal at other locations, including locations with respect to the semiconductor device 604.

In various implementations, the detection component is arranged to output the electrical reference signal to the reference pixel 208.

In some implementations, the imaging system 102 may include a control module (not shown) arranged to calculate a distance of the object 106 from the imaging system 102, based on the measured time of the reflected light radiation. Accordingly, the control module may be arranged to convert a signal output from the sensor module 206 (or from the pixels of the sensor module 206) to a distance of the object 106 from the imaging system 102. Further, in an implementation, the control module may be arranged to convert the output signal to a three-dimensional image of the object 106. For example, the imaging system 102 may be arranged to output a distance, a three-dimensional image of the detected object 106, tracking coordinates of the object 106, and so forth, to a display device, to another system arranged to process the information, or the like.

The techniques, components, and devices described herein with respect to an imaging system 102 are not limited to the illustrations in FIGS. 1-6, and may be applied to other systems, designs, and/or applications 104 without departing from the scope of the disclosure. In some cases, additional or alternative components may be used to implement the techniques described herein. It is to be understood that an imaging system 102 may be stand-alone, or may be part of another system (e.g., integrated with other components, systems, etc.).

Representative Process

Figure 7:
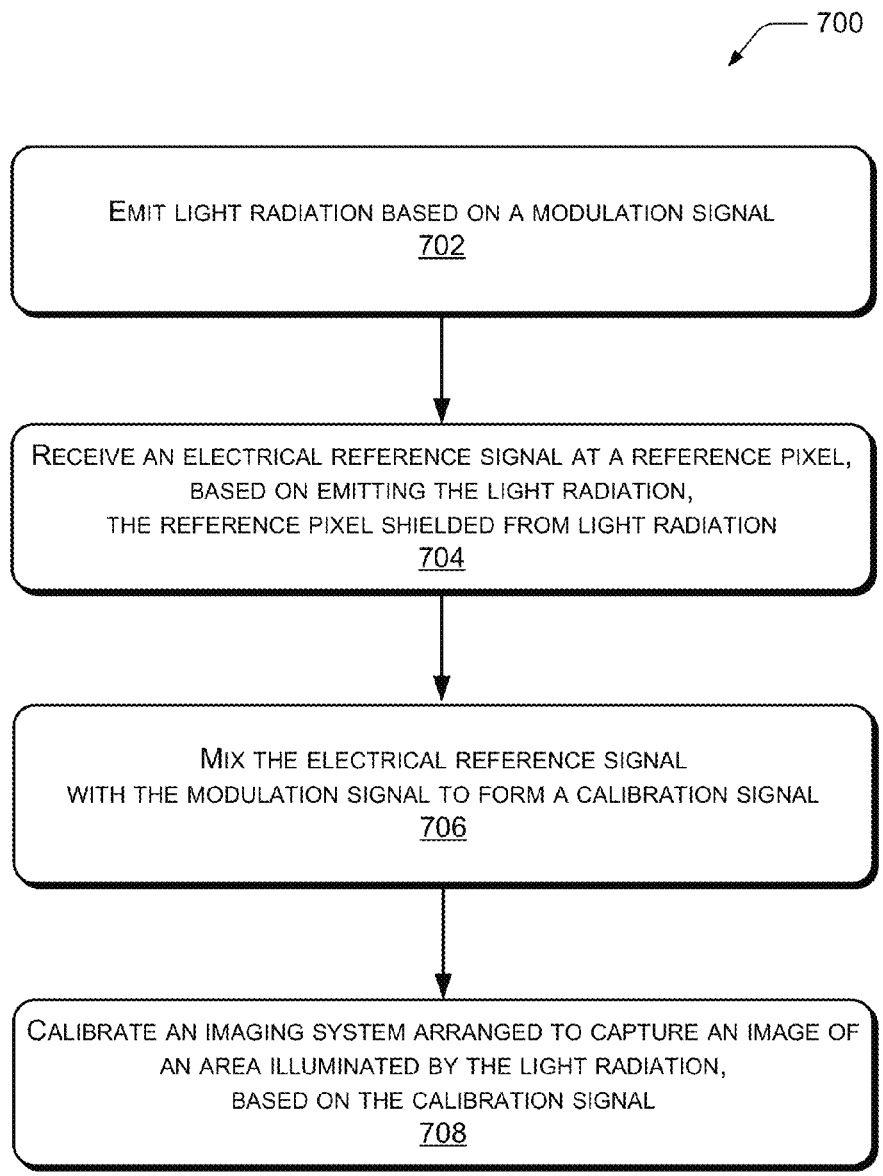
FIG. 7 is a flow diagram illustrating an example process for calibrating an imaging system, according to an implementation.

FIG. 7 illustrates a representative process 700 for dynamically calibrating an imaging system (such as imaging system 102, for example). The process 700 describes receiving and mixing electrical signals at a reference pixel (such as reference pixel 208, for example), to form a calibration signal. In an implementation, the reference pixel is shielded from light radiation. The process 700 is described with reference to FIGS. 1-6.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

At block 702, the process includes emitting light radiation (from an illumination module such as illumination module 202, for example) based on a modulation signal. For example, the light radiation may be emitted to illuminate an area (such as area 108, for example). In one example, the light radiation may be emitted by an emitter device (such as illumination source 602, or the like) comprising an LED or laser emitter, for example.

In some implementations, the light radiation may be modulated light, modulated via the modulation signal. For example, the light may be modulated using a modulation component (such as modulation component 204) and may be modulated in correlation to modulation of one or more photosensitive pixels of the imaging system.

In various implementations, the area may be relative to a vehicle, a computing device, or the like (such as application 104), for example.

In various implementations, the process includes receiving reflected light radiation by an imaging sensor (such as sensor module 206) to capture images. The imaging sensor may be comprised of a plurality of photosensitive pixels, for example. The light reflection may be received by the imaging sensor via optics, a receiver, an antenna, or the like, for instance. In an implementation, the captured images are three-dimensional images.

At block 704, the process includes receiving an electrical reference signal at a reference pixel (such as reference pixel 208, for example), based on emitting the light radiation. In one example, the reference pixel is shielded from light radiation. In another implementation, the reference pixel is one pixel of the plurality of pixels comprising the imaging sensor.

For example, in one implementation, the process includes modifying at least one photosensitive pixel of an array of photosensitive pixels to form the reference pixel. In the example, the reference pixel is arranged to receive an electrical signal based on the light radiation, and other pixels of the array of photosensitive pixels are arranged to receive reflected light radiation and to output signals to form an image of the area.

In an implementation, the process includes receiving the light radiation at a photosensitive component (such as photodetector 402, for example) and outputting the electrical reference signal at the photosensitive component, based on the light radiation received. In an implementation, the amplitude of the electrical reference signal is proportional to the intensity of the light radiation received at the photosensitive component. In another implementation, the electrical reference signal contains phase information of the light radiation received.

In an alternate implementation, the process includes detecting a voltage drop across the illumination source of the imaging system, and outputting the electrical reference signal, based on the voltage drop. In another implementation, the process includes detecting a voltage at a gate of a semiconductor device arranged to control the illumination source of the imaging system, and outputting the electrical reference signal, based on the voltage detected.

At block 706, the process includes mixing the electrical reference signal with the modulation signal to form a calibration signal. For example, the reference pixel may be arranged to mix the electrical reference signal with the modulation signal to form the calibration signal, in various implementations.

At block 708, the process includes calibrating the imaging system based on the calibration signal. In an implementation, the imaging system is arranged to capture an image of the area illuminated by the light radiation.

In an implementation, the process includes compensating for a delay of an illumination module of the imaging system with the calibration signal. For example, in an implementation, the calibration signal is used to adjust a measurement of the imaging system. In the example, the measurement may be inaccurate due to a delay in the imaging system, and the calibration signal may include information to compensate for the delay.

In an implementation, the process includes using time-of-flight techniques such as measuring a time from emitting the light radiation to receiving the reflection of the light radiation and calculating a distance of an object based on the measured time. In various implementations, the process includes outputting images, distance information, gesture information, and/or the like. Additionally, the process may include outputting a three-dimensional image of detected objects, tracking coordinates of an object, and so forth, to a display device, to another system arranged to process the information, or the like.

In alternate implementations, other techniques may be included in the process 700 in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. An imaging system, comprising:
   a sensor module, including a plurality of photosensitive pixels, to capture an image of an area, and
   at least one reference pixel to:
      receive an electrical reference signal,
         the electrical reference signal being an electrical representation of an optical signal that corresponds to light radiation emitted by an illumination module,
      mix the electrical reference signal with an electrical modulation signal in order to form a calibration signal,
         the electrical modulation signal being associated with modulating an illumination of the area, and
      output the calibration signal,
         the calibration signal being output in order to calibrate the imaging system.

2. The imaging system of claim 1, further comprising a shield to inhibit the at least one reference pixel from receiving the light radiation.

3. The imaging system of claim 1, where the at least one reference pixel is to receive the electrical reference signal from a photosensitive pixel of the plurality of photosensitive pixels.

4. The imaging system of claim 1, where the electrical reference signal includes phase information of the optical signal.

5. The imaging system of claim 1, where the at least one reference pixel comprises a photon mixing device (PMD) capable of mixing two or more electrical signals.

6. The imaging system of claim 1, where a photosensitive pixel, of the plurality of photosensitive pixels, is to:
   receive the light radiation; and
   output a signal, corresponding to the light radiation, to form the image of the area.

7. A system, comprising:
   an illumination module arranged to emit light radiation to illuminate at least a portion of an area;
   a sensor module comprising a plurality of photosensitive pixels to capture an image of the area,
   a reference pixel to:
      receive an electrical reference signal based on the illumination module emitting light radiation,
         the electrical reference signal being an electrical representation of an optical signal that corresponds to the light radiation,
      mix the electrical reference signal with an electrical modulation signal to form a calibration signal, and
      output the calibration signal; and
   a calibration unit to calibrate the system based on the calibration signal.

8. The system of claim 7, further comprising a modulation component to modulate the light radiation via the electrical modulation signal.

9. The system of claim 7, further comprising a photosensitive component to:
   receive the light radiation;
   generate the electrical reference signal based on the light radiation; and
   output the electrical reference signal to the reference pixel.

10. The system of claim 7, further comprising a detection component to:
    detect a voltage drop across an illumination source of the illumination module or detect a current through the illumination source;
    generate the electrical reference signal based on the voltage drop or the current; and
    output the electrical reference signal to the reference pixel.

11. The system of claim 7, further comprising a semiconductor device to control an illumination source of the illumination module, and a detection component to detect the electrical reference signal based on a voltage at a gate of the semiconductor device.

12. The system of claim 7, where the reference pixel includes a photon mixing device (PMD) capable of mixing electrical signals.

13. The system of claim 7, where the reference pixel is shielded from the light radiation.

14. The system of claim 7, where the calibration unit is to dynamically calibrate the system based on changes to the calibration signal.

15. The system of claim 7, where the system is to capture a three-dimensional image of an object within the area, based on time-of-flight principles.

16. The system of claim 7, where the calibration signal is indicative of a delay of the illumination module associated with initiating an illumination sequence and emitting the light radiation.

17. A method, comprising:
emitting light radiation based on an electrical modulation signal;
receiving, by a reference pixel, an electrical reference signal associated with the light radiation,
the electrical reference signal being an electrical representation of an optical signal that corresponds to the light radiation, and
the reference pixel being shielded from the light radiation;
mixing the electrical reference signal with the electrical modulation signal in order to form a calibration signal,
the calibration signal being associated with calibrating an imaging system arranged to capture an image of an area illuminated by the light radiation; and
calibrating the imaging system based on the calibration signal.

18. The method of claim 17, further comprising:
receiving the light radiation at a photosensitive component;
generating the electrical reference signal based on the light radiation; and
outputting the electrical reference signal to the reference pixel.

19. The method of claim 17, further comprising:
detecting a voltage drop across an illumination source of the imaging system or detecting a current through the illumination source;
generating the electrical reference signal based on the voltage drop or the current; and
outputting the electrical reference signal to the reference pixel.

20. The method of claim 17, further comprising:
detecting a voltage at a gate of a semiconductor device arranged to control an illumination source of the imaging system;
generating the electrical reference signal based on the voltage; and
outputting the electrical reference signal to the reference pixel.

21. The method of claim 17, where the calibration signal is indicative of a delay of the imaging system associated with an illumination module of the imaging system.

22. The method of claim 17, further comprising:
modifying a photosensitive pixel, of an array of photosensitive pixels, to form the reference pixel,
where other pixels, of the array of photosensitive pixels, are to receive the light radiation and output signals to form the image of the area.

23. A three-dimensional imaging device, comprising:
a sensor module comprising a plurality of photosensitive pixels to use time-of-flight principles to capture a three-dimensional image of an object within an area, based on a modulated illumination of the area, and
at least one reference pixel to:
receive an electrical reference signal based on the modulated illumination of the area,
the electrical reference signal being an electrical representation of an optical signal that corresponds to light radiation associated with the modulated illumination of the area;
receive an electrical modulation signal associated with the modulated illumination of the area; and
output a calibration signal based on the electrical reference signal and the electrical modulation signal,
the calibration signal being output in order to calibrate the three-dimensional imaging device.

24. The imaging system of claim 1, further comprising a detection component to:
detect a voltage drop across an illumination source of the illumination module or detect a current through the illumination source;
generate the electrical reference signal based on the voltage drop or the current; and
output the electrical reference signal to the reference pixel.

25. The system of claim 7, where a photosensitive pixel, of the plurality of photosensitive pixels, is to:
receive the light radiation; and
output a signal, corresponding to the light radiation, to form the image of the area.

* * * * *